UNITED STATES PATENT OFFICE.

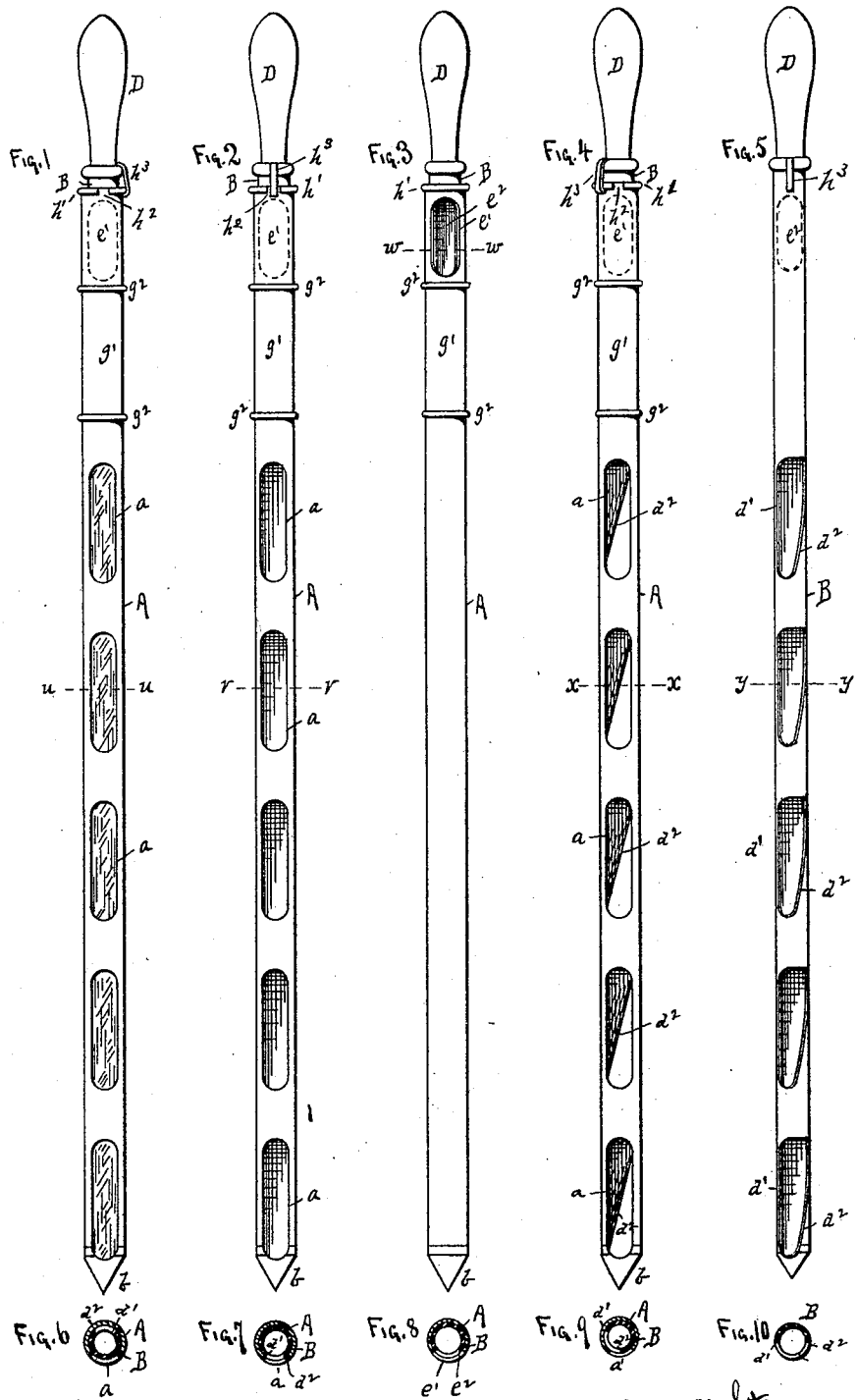

JAMES N. STACY, OF MINNEAPOLIS, MINNESOTA.

GRAIN-SAMPLER.

SPECIFICATION forming part of Letters Patent No. 460,666, dated October 6, 1891.

Application filed April 21, 1891. Serial No. 389,849. (No model.)

*To all whom it may concern:*

Be it known that I, JAMES N. STACY, a citizen of the United States, residing at Minneapolis, in the county of Hennepin and State of Minnesota, have invented certain new and useful Improvements in Grain-Samplers, of which the following is a specification.

This invention relates to implements for extracting samples of grain from cars, bins, and similar receptacles; and it consists in the construction, combination, and arrangement of parts, as hereinafter shown and described, and specifically pointed out in the claims.

In the drawings, Figure 1 is a front elevation of the sampler closed, and Fig. 2 is a similar view of the implement open. Fig. 3 is a rear elevation showing the discharge-ports. Fig. 4 is a front elevation of the sampler partially closed. Fig. 5 is a similar view of the tubular valve removed from its casing. Fig. 6 is a cross-section on the line $u\ u$ of Fig. 1. Fig. 7 is a cross-section on the line $v\ v$ of Fig. 2. Fig. 8 is a cross-section on the line $w\ w$ of Fig. 3. Fig. 9 is a cross-section on the line $x\ x$ of Fig. 4. Fig. 10 is a cross-section on the line $y\ y$ of Fig. 5.

The sampler consists of an outer tube or casing A, having elongated perforations or ports $a$ at intervals throughout its length, and with a pointed lower end $b$ and an inner tube or valve B fitting into the outer casing-tube closely, and with a handle D, by which it may be revolved or oscillated in the outer or casing tube. The valve-tube B is provided with elongated perforations or ports corresponding with the ports $a$ in the casing-tube and registering therewith on one side $d'$, but inclined on the other side, as at $d^2$, so that when the valve-tube is turned in the casing-tube the inclined sides $d^2$ will pass across beneath the ports $a$ at an angle, as shown in Fig. 4.

Formed through the back of the casing-tube A, near its upper end, is an elongated perforation or port $e'$, and likewise formed through the valve-tube B is a similar port $e^2$, the two ports $e'\ e^2$ "registering" when the implement is closed, and thereby providing a means of discharge for the contents.

Between the discharge-port $e'$ and the uppermost of the ports $a\ a$ a space $g'$ is left in the casing-tube unperforated and with or without the rings $g^2$ to form a gripping-space for the hand of the operator, so that the hand will not be in danger of being caught between the edges of the ports when the valve-tube is actuated.

Surrounding the upper end of the casing-tube A is a ring $h'$, having an opening $h^2$ on one side and on the handle D, as a catch $h^3$, adapted to enclasp the ring, as shown in Figs. 1 and 4, so as to render the parts A and B inseparable, except when the catch $h^2$ is placed opposite the opening $h^3$, as in Fig. 2, a position it would not be liable to assume while in use.

In grain-samplers as heretofore constructed with the ports in the casing-tube and valve-tube of exactly the same shape and size, when the implement is inserted into the body of the grain and opened to allow the grain to fill the valve-tube and then closed to retain the contents, the edges of the ports being parallel they all close uniformly throughout their whole length and the kernels of grain which catch between the adjacent edges offer a large amount of resistance to the closing of the valve-tube. By forming one edge of each of the ports in the valve-tube inclined, as shown at $d^2$, they cross the ports $a$ at an angle or "shearing," so that only a few kernels of grain can possibly be caught by each at the final closing of the ports, and generally none of the grain at all is caught, as the shearing action has the effect of forcing the grain out of the way or passing through it with much less resistance than when the straight-edged ports are employed. This is an important feature of my invention, as it renders the implement much more easy of action and preserves the samples of grain in much better shape than when the sides of the ports in the valve are parallel, as very few, if any, of the kernels are crushed when the valve-tube is closed.

The discharge-ports $e'\ e^2$ are also an important feature of my invention, as I am enabled to discharge all the contents of the sampler from one point, and thereby avoid waste or the spilling of the grain.

Having thus described my invention, what I claim as new is—

1. In a grain-sampler, the outer or casing tube A, having the ports $a$, in combination with the inner or valve tube B, having the corresponding ports, one or more sides of which are inclined, so that when said valve-tube is closed said inclined sides cross the ports in said casing-tube at an angle, substantially as and for the purpose set forth.

2. In a grain-sampler, the perforated outer or casing tube A, having the discharge-port $e'$, and perforated inner or valve tube B, having discharge-port $e^2$, adapted to register with said port $e'$ when said sampler is closed, substantially as and for the purpose set forth.

3. In a grain-sampler, the perforated outer or casing tube having the rim $h'$ around its upper end, and with the opening $h^2$, in combination with the perforated inner or valve tube having the catch $h^3$, adapted to enclasp said rim, substantially as and for the purpose set forth.

4. In a grain-sampler, the perforated outer or casing tube having the unperforated grip-space $g'$ and discharge-port $e'$, and the perforated inner or valve tube B, having the discharge-port $e^2$ and handle D, whereby the valve-tube may be actuated without danger to the hand of the operator, substantially as and for the purpose set forth.

In testimony whereof I have hereunto set my hand in the presence of two subscribing witnesses.

JAMES N. STACY.

Witnesses:
  W. A. FISHER,
  J. W. BRIGHAM.